United States Patent [19]

Armbruster

[11] Patent Number: 4,977,695
[45] Date of Patent: Dec. 18, 1990

[54] ILLUMINATED MEDALLION

[76] Inventor: Joseph M. Armbruster, 2700 NE. 47th St., Lighthouse Point, Fla. 33064

[21] Appl. No.: 133,345

[22] Filed: Dec. 15, 1987

[51] Int. Cl.$^5$ .............................................. G09F 13/00
[52] U.S. Cl. ........................................ 40/541; 40/556
[58] Field of Search ................ 40/553, 555, 556, 575, 40/576, 541, 564

[56] References Cited

U.S. PATENT DOCUMENTS

| | | | |
|---|---|---|---|
| 1,423,641 | 7/1922 | Bausman | 40/556 |
| 1,542,619 | 6/1925 | Locke | 40/553 |
| 1,697,804 | 1/1929 | Blackmore | 40/556 |
| 1,962,838 | 6/1934 | Regester | 40/556 |
| 2,430,232 | 11/1947 | Lynch | 40/556 |
| 2,674,821 | 4/1954 | Sheinbart | 40/553 |
| 3,203,126 | 8/1965 | Eliot | 40/553 |
| 4,205,521 | 6/1980 | Cazanas | 40/553 |

FOREIGN PATENT DOCUMENTS 417362 11/1910 France .................... 40/553

*Primary Examiner*—Gene Mancene
*Assistant Examiner*—Michael Lynch
*Attorney, Agent, or Firm*—Fleit, Jacobson, Cohn, Price, Holman & Stern

[57] ABSTRACT

An illuminated medallion adapted for use on vehicles such as automobiles, boats or other owner or passenger occupied vehicles, in desk top display units or other interior or exterior display units by which various indicia, insignia or the like can be displayed in a manner to facilitate effective observation thereof. The illuminated medallion includes a lens having various insignia, indicia and the like including transparent areas, colored transparent areas combined with a backing plate with a light bulb mounted thereon in a unique relationship to the lens and a hollow, externally threaded mounting stud for supporting attachment to a bracket with the wires supplying electrical energy to the light bulb passing through the hollow threaded stud. The arrangement of the lens, light bulb and backing plate is such that substantially total light diffusion through a diffusion disc is obtained with all hot spots or bright spots being eliminated. The bulb socket and stud along with the wires are all molded into a unitary structure with the push-in type bulb being replaceable. The backing plate has a spacer thereon for spacing the lens in closely spaced relation to the light bulb with the lens being removably secured to the backing plate in sealed relation to enable replacement of the bulb and to enable a lens with desired indicia or insignia incorporated therein to be assembled with respect to the backing plate.

7 Claims, 1 Drawing Sheet

ILLUMINATED MEDALLION

BACKGROUND OF THE INVENTION

Field of the Invention

The present invention generally relates to an illuminated medallion adapted for use on vehicles such as automobiles, boats or other owner or passenger occupied vehicles, in desk top display units or other interior or exterior display units by which various indicia, insignia or the like can be displayed in a manner to facilitate effective observation thereof. The illuminated medallion includes a lens having various insignia, indicia and the like including transparent areas, colored transparent areas combined with a backing plate with a light bulb mounted thereon in a unique relationship to the lens and a hollow, externally threaded mounting stud for supporting attachment to a bracket with the wires supplying electrical energy to the light bulb passing through the hollow threaded stud. The arrangement of the lens, light bulb and backing plate is such that substantially total light diffusion through a diffusion disc is obtained with all hot spots or bright spots being eliminated. The bulb socket and stud along with the wires are all molded into a unitary structure with the push-in type bulb being replaceable. The backing plate has a spacer thereon for spacing the lens in closely spaced relation to the light bulb with the lens being removably secured to the backing plate in sealed relation to enable replacement of the bulb and to enable a lens with desired indicia or insignia incorporated therein to be assembled with respect to the backing plate.

INFORMATION DISCLOSURE STATEMENT

Vehicles of various types have been provided with identifying indicia or insignia which, in some instances, may include the initials of an owner, identifying insignia of a service club, fraternal organization, university, country club, as well as logos or other identifying indicia. Also, illuminated devices including signs mounted on automobiles and in various display units are well-known. However, the prior art does not disclose the specific structure and relationship of structural components incorporated into the present invention. A separate information disclosure statement will be filed.

SUMMARY OF THE INVENTION

An object of the present invention is to provide an illuminated medallion for mounting in an observable position on an automobile or other land, sea or air vehicle, on a desk top or in other display units and which includes a unique arrangement of lens, coating, diffuser disc, backing plate, light bulb assembly and supporting stud which enables the medallion to be effective in daytime as well as nighttime and further enables the medallion to be constructed of a minimum number of components in order to retain the manufacturing costs and maintenance requirements at a minimum.

Another object of the invention is to provide an illuminated medallion in accordance with the preceding object in which the backing plate is provided with a projecting spacer on one surface thereof in the form of a continuous peripheral projection and a hollow externally threaded mounting stud extending from the opposite face with a bulb socket including metal contacts and wires being molded into the hollow stud in a manner to provide a unitary structure with the bulb socket receiving a push-in type bulb oriented generally centrally of the spacer.

A further object of the invention is to provide an illuminated medallion in accordance with the preceding objects in which the externally threaded stud is attached to a bracket by which the medallion can be supported in various locations on a vehicle including the grill area or license plate bracket area of an automobile with various bracket arrangements being capable of use in order to mount the medallion in any desired location for observation.

Still another object of the invention is to provide an illuminated medallion in which the lens is a clear transparent member having a coating applied to the inner surface by a pad printer to provide indicia, insignia or other observable information imparting ornamentation or the like with a diffuser disc having a pebbled inner surface spaced from the bulb in a manner to eliminate hot spots due to the light diffusion provided by the diffusion disc and lens and the relationship between the diffuser disc and light bulb.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
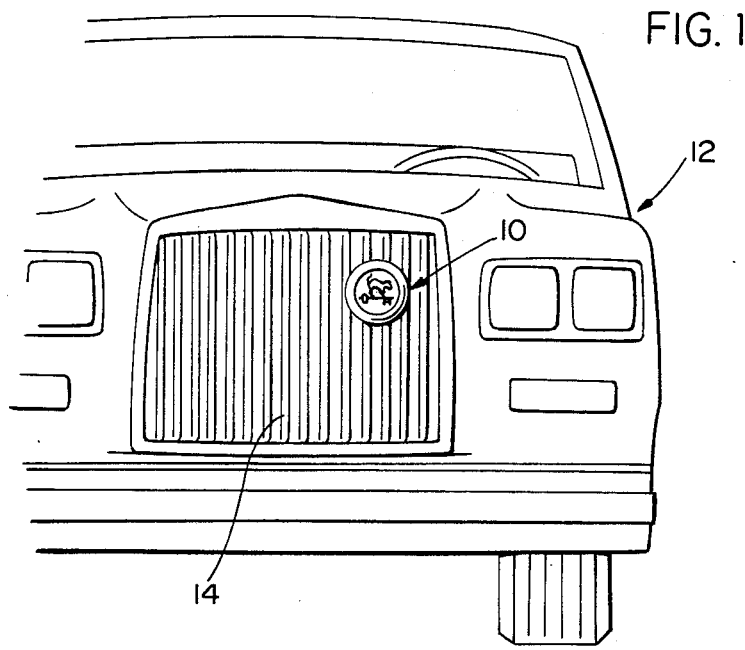
FIG. 1 is an elevational view of the illuminated medallion of the present invention associated with an automobile grill.

Referring now specifically to the drawings, the illuminated medallion of the present invention is generally designated by reference numeral 10 and, as illustrated in FIG. 1, may be mounted on a vehicle such as an automobile 12 and may be oriented on the hood or grill 14. The medallion may be mounted in other locations on the vehicle such as from the license plate, the license plate bracket, the bumper, the hood, fender or in any other location desired on an automobile or other types of vehicles or in other display environments. The illuminated medallion 10 can be utilized to provide a readily observable illuminated device that may display well-known insignias, emblems, logos for service clubs, fraternal organizations, universities, country clubs and various corporate logos and the like in substantially any desired location with the illuminated medallion being connected to a suitable source of electricity normally provided by the battery powered electrical system of the vehicle, a transformer or a battery or batteries.

Figure 2:
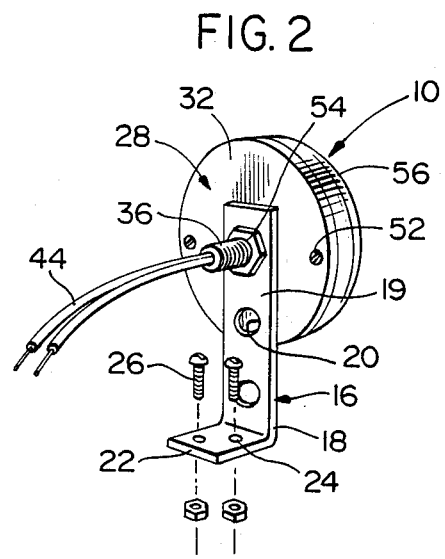
FIG. 2 is a perspective view illustrating the medallion and a typical mounting bracket.

As illustrated in FIG. 2, the illuminated medallion is supported by a bracket structure 16 in the form of a strap 18 of metal, plastic or the like which includes perpendicular legs with an elongated leg 19 having a plurality of apertures 20 and the shorter leg 22 having an aperture or apertures 24 to receive mounting fastener screws and nuts or other fastening devices 26 with the shape, size and configuration of the bracket 16 being varied depending upon the requirements of each installation.

Figure 3:
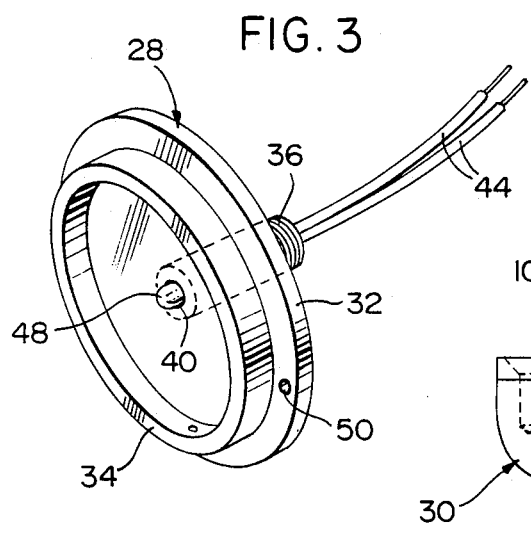
FIG. 3 is a perspective view of the unitary backing plate, spacer and hollow stud illustrating the light bulb associated therein.
Figure 4:
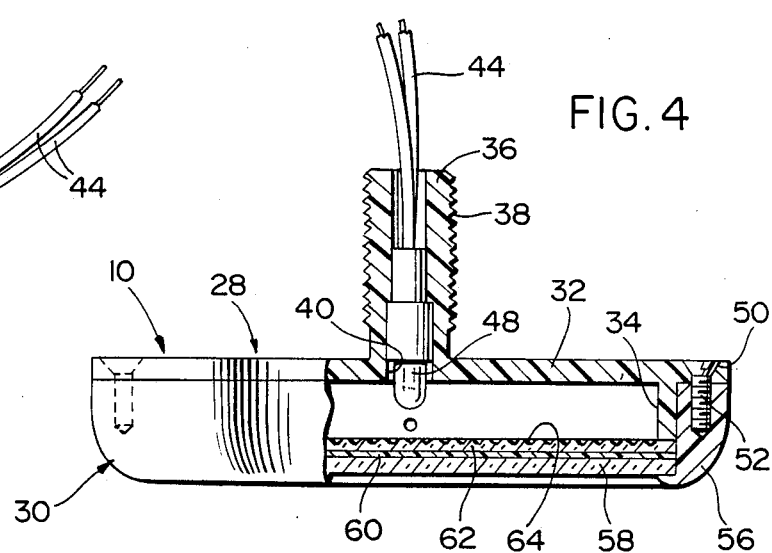
FIG. 4 is a sectional view of the illuminated medallion of the present invention illustrating the relationship of the components.
Figure 5:
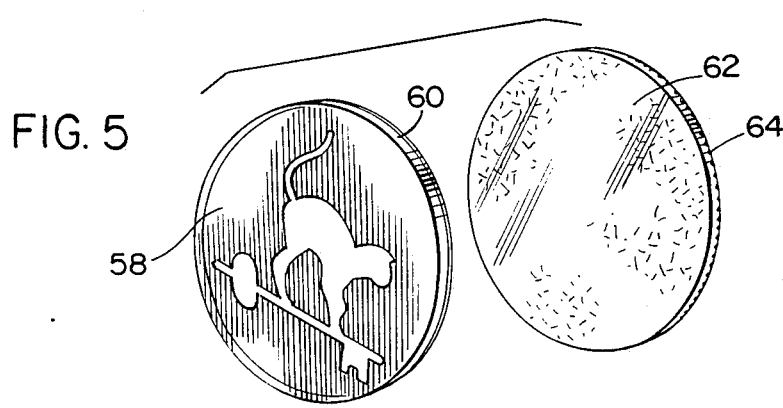
FIG. 5 is an exploded perspective view of the lens, coating and diffuser disc.

The medallion 10 includes a backing plate assembly 28 of unitary construction as illustrated in FIG. 3 and a lens assembly 30 mounted on the backing plate assembly 28. The backing plate assembly 28 includes a backing plate 32 of circular or other configurations which includes a cylindrical projection 34 integral with the front face thereof and forming a spacer for the lens assembly with the cylindrical projection 34 being concentric with the plate 32 and of unitary construction therewith. Projecting from the other face of the plate 32 is a hollow, cylindrical stud 36 which is externally threaded at 38 with the stud 36 also being unitary with the backing plate 32 and centrally located therein with the backing plate 32 including an aperture 40 in alignment with the hollow central interior of the hollow stud 36.

Positioned interiorly of the hollow stud 36 is a light bulb socket 42 having the usual metal contacts and provided with insulated electrical wires 44 connected thereto with the wires extending out through the terminal end of the stud 36 for connection with the electrical system of a vehicle. The socket 42 includes metal contacts and receives the base portion of a push-in type light bulb 48 which is oriented in the opening 40 with approximately one-half of the light bulb projecting therethrough to orient the light bulb filament centrally in relation to the face of the backing plate 32 with the light bulb 48 being located centrally with respect to the projection or spacer 34 as illustrated in FIG. 3.

The backing plate 32 includes a plurality of circumferentially spaced apertures 50 which may be countersunk for receiving screw fasteners 52 to secure the lens assembly 30 detachably onto the backing plate assembly 28. Also, a retaining nut 54 is screw threaded onto the threaded stud 36 for removably and adjustably securing the illuminated medallion to the bracket 16 and, in some instances, two nuts may be positioned on the threaded stud in order to provide an offset relationship between the bracket and the medallion. As indicated, the backing plate 32, projection 34 and stud 36 are of one piece plastic construction, although other materials may be used if desired, and the light socket 42 and wires 44 are molded into the stud 36 to provide a unitary structure with the bulb 48 being changeable by pulling the bulb outwardly and inserting a new bulb in place with the metal wire contacts on the base portion of the bulb engaging the metal contacts in the light socket 42 in a conventional and well-known manner thereby facilitating the assembly and construction of the device since the backing plate assembly 28 will be of unitary construction with only the light bulb 4 being removable.

Figure 6:
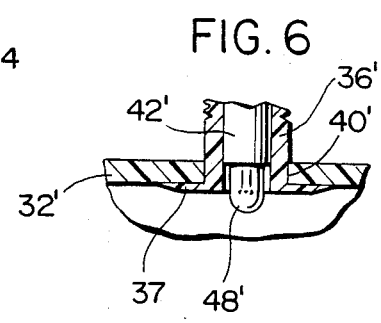
FIG. 6 is a fragmented sectional view, similar to FIG. 4, illustrating a modified structure.

FIG. 6 illustrates a modified arrangement of the tubular stud 36' which is a separate component from the backing plate 32'. In this construction, the inner end of the stud 36' has a laterally extending and laterally tapering thin flange 37 which engages the inner surface of the backing plate 32'. This enables the preassembled stud 36', socket 42' and bulb 48' to be inserted through the aperture 40' until flange 37 engages the backing plate 32'. With this construction, the preassembled stud and bulb can be used with any shape and size of backing plate assembly and can be assembled by a customer or user. A small groove or recess may be provided in the stud 36' at its juncture with the flange 37 to provide a positive snap-fitting interlocking engagement between the stud 36' and backinq plate 32'. Also, a small quantity of sealant may be provided around this juncture in order to maintain the moistureproof integrity of the medallion.

The lens assembly 30 includes a rim or frame 56 secured to the backing plate 32 by the fasteners 52 outwardly of the projection or spacer 34 together with a transparent lens 58 of plastic material. The rim or frame 56 and the lens 58 may be separate components with the rim or frame 56 being injection molded plastic or dye cast metal. Alternatively, the rim or frame 56 and the lens 58 can be of one piece construction.

The lens 58 is preferably a transparent polycarbonate disc having a coating 60 of paint on the inner surface thereof which is applied by a pad printing process which is a known technology. The use of a pad printer enables a design to be printed with a paint material which has a high gloss for daytime viewing and proper light transmissivity when illuminated by the light bulb 48. Any desired indicia, insignia or ornamentation may be pad printed on the lens 58, including distinguishably colored areas.

Positioned against and interiorly of the lens 58 and coating 60 is a diffusion panel 62 of translucent plastic material which has a "pebble" pattern 64 formed on the surface thereof which faces the bulb 48 in order to diffuse the light so there are no "hot spots" with the spacer or projection 34 serving to retain these components in assembled and sealed relation or the components may be of unitary construction with the frame or rim 56 being molded to the transparent lens 60 and disc 62. As indicated, the metal or plastic rim, clear plastic lens, pad printed coating and diffusion disc form a sandwich arrangement with the coating being oriented on the inner surface of the clear plastic lens. Alternatively, if all plastic material is used, the rim or frame may be provided with a chrome or similar finish with the lens being molded into the rim so that the rim and lens are of one piece with the rim then being plated with chrome or the like by masking the lens. By using such techniques, various colored transparent areas may be incorporated into the medallion in order to produce insignia, emblems or the like that have distinguishably colored areas. Various seals such as cork gaskets, rubber gaskets, O-ring seals and the like may be incorporated between the components to limit water intrusion and, if desired, a moisture drain may be provided in the bottom of the rim.

While a circular medallion 10 has been shown, the shape and configuration and size may vary including square, oval, oblong, triangular and the like. The medallion may have an overall diameter of approximately 4" although this may vary, and of course the shape may vary, and the medallion may have a thickness of approximately ¾", although this also may be varied. By using the diffusion disc and positioning the bulb so that a major portion thereof is recessed into the threaded stud, the diffusion disc will substantially completely diffuse the light passing therethrough so that the illuminated medallion will not have any "hot spots" or bright areas.

By using a bracket with multiple holes, a vast array of mounting configurations may be utilized. If the grill bars of an automobile do not permit the attachment of a bracket, then the bracket may be mounted on the bumper or front license tag support or, in those states that do not require a front license tag, the bracket may be eliminated and the threaded stud may be used to mount the medallion directly to the vehicle by drilling a small hole in a hood, trunk lid, fender or the like and extending the threaded stud therethrough after which a retaining lock washer and nut may be assembled onto the threaded stud inwardly of the sheet metal panel in which the aperture was formed.

In addition to the illuminated medallion being used on a vehicle, it also can be incorporated into a desk top unit, wall plaque, window unit or other display locations. This type of display unit may be powered by a transformer to convert 110 volt AC to 12 volt DC or by a rechargeable battery with an automatic switch which will turn off the light after a predetermined time interval such as after two hours so that the batteries will not be accidentally totally discharged. The battery or batteries may be replaceable or rechargeable.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An illuminated medallion comprising a backing plate assembly, a lens assembly mounted on said backing plate assembly and means for supporting the backing plate assembly from a supporting structure, said backing plate assembly comprising a flat, thin, circular backing plate having generally planar surfaces, a projection on said backing plate in the form of a cylindrical flange extending perpendicular to one planar surface with the flange being concentric with the backing plate and spaced inwardly from but adjacent to the peripheral edge thereof, said means for mounting the backing plate assembly including a tubular threaded stud having a diameter substantially less than the backing plate and located centrally and rigidly with respect the backing plate and being aligned with a central opening in the backing plate and extending perpendicular to the other planar surface, said opening having a diameter substantially less than the inside diameter of the flange, said stud being externally threaded for engagement with a supporting structure, electrical wires extending into said stud, a bulb socket and bulb connected with the wires with the bulb socket being disposed in the tubular stud, said bulb projecting from the opening in the backing plate, said lens assembly including a transparent lens and a coating with indicia on the inner surface thereof and a diffuser disc for diffusion of the light from the light bulb for illumination by the diffused light passing through the lens assembly to enable the indicia to be observed externally of the medallion.

2. The structure as defined in claim 1 wherein said coating includes transparent areas, colored transparent areas and opaque areas formed by pad printing on the transparent lens whereby the diffused light passing through the lens assembly will illuminate the indicia.

3. The structure as defined in claim 1 wherein said lens assembly includes a peripheral rim disposed externally of the flange on the backing plate with the flange defining a spacer engaging the periphery of the diffuser disc to retain the transparent lens and diffuser disc assembled and means securing the rim of the lens assembly to the peripheral portion of the backing plate to enable assembly of the lens assembly on the backing plate to facilitate assembly of the components and to facilitate replacement of the light bulb.

4. The structure as defined in claim 3 wherein said light socket and wires are formed unitarily with the threaded stud, said threaded stud, backing plate and flange being of plastic material, said light bulb including a push-in base portion and said light socket being connected with the wires and receiving the push-in base of the light bulb with a minor portion of the light bulb projecting centrally from the backing plate for diffusion of the light by the diffuser disc to eliminate hot spots and bright areas in the illuminated indicia.

5. In an illumination device having a lens assembly provided with means producing an observable insignia, emblem and the like when illuminated, a backing plate assembly adapted to supportingly engage and illuminate the lens assembly, said backing plate assembly comprising a backing plate having generally planar surfaces with one surface including a peripherally continuous flange projecting from one planar surface adjacent the periphery thereof, the other planar surface including a hollow, externally threaded stud with the flange, backing plate and stud being of plastic material, said backing plate including an opening in registry with the threaded stud, a push-in light bulb positioned in said opening with the push-in portion of the light bulb being received in the threaded stud, said light bulb having a tip end projecting from said one planar surface a short distance in substantial radially spaced relation to the flange, a light socket including conductive wires positioned in said stud and receiving the base portion of the bulb inserted through the opening in the backing plate for energizing the bulb when the wires are connected to a source of electrical energy, said wires and socket being molded in the hollow stud to provide a unitary structure therewith with only the light bulb being separable from the light socket and stud for replacement of the light bulb when necessary.

6. The structure as defined in claim 5 wherein said backing plate and stud are of one-piece construction.

7. The structure as defined in claim 5 wherein said stud is a separate component with means on the inner end thereof supportingly engaged with the opening in the backing plate.

* * * * *